United States Patent
Diab et al.

(10) Patent No.: US 8,385,237 B2
(45) Date of Patent: *Feb. 26, 2013

(54) METHOD AND SYSTEM FOR SIMPLEX OR DUPLEX TRANSMISSION MODE OF AN ETHERNET LINK IN AN ENERGY EFFICIENT NETWORK

(75) Inventors: Wael William Diab, San Francisco, CA (US); Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/271,661

(22) Filed: Oct. 12, 2011

(65) Prior Publication Data

US 2012/0026922 A1 Feb. 2, 2012

Related U.S. Application Data

(63) Continuation of application No. 12/235,345, filed on Sep. 22, 2008, now Pat. No. 8,064,373.

(60) Provisional application No. 61/014,183, filed on Dec. 17, 2007, provisional application No. 61/094,612, filed on Sep. 5, 2008.

(51) Int. Cl.
*H04L 12/26* (2006.01)

(52) U.S. Cl. ........................................ 370/296
(58) Field of Classification Search .................. 370/296
See application file for complete search history.

(56) References Cited

U.S. PATENT DOCUMENTS

| | | | |
|---|---|---|---|
| 5,432,775 A | 7/1995 | Crayford | |
| 6,795,450 B1 | 9/2004 | Mills et al. | |
| 7,388,909 B2 | 6/2008 | Lin et al. | |
| 7,627,325 B2 | 12/2009 | McCoy | |
| 7,835,382 B2 * | 11/2010 | Lida et al. | 370/437 |
| 8,064,373 B2 * | 11/2011 | Diab et al. | 370/296 |
| 2002/0123350 A1 | 9/2002 | Bui | |
| 2005/0105545 A1 | 5/2005 | Thousand et al. | |
| 2006/0034295 A1 | 2/2006 | Cherukuri et al. | |
| 2007/0280239 A1 | 12/2007 | Lund | |
| 2011/0007664 A1 * | 1/2011 | Diab et al. | 370/254 |

OTHER PUBLICATIONS

M. Gupta et al., "Using Low-Power Modes for Energy Conservation in Ethernet LANs", INFOCOM 2007 (May 2007), pp. 2451-2455.
M. Gupta et al., "Dynamic Ethernet Link Shutdown for Energy Conservation on Ethernet Links", Communications 2007 (Jun. 2007), pp. 6156-6161.

* cited by examiner

Primary Examiner — Melvin Marcelo
(74) Attorney, Agent, or Firm — Duane S. Kobayashi

(57) ABSTRACT

Ethernet link partners coupled via an Ethernet link that comprises a plurality of channels are operable to transmit and receive at different maximum data rates on different channels. Based on link conditions, a link partner may negotiate a transmission rate and/or accept or reject a reception rate. Based on link conditions, a first link partner is configured to communicate in simplex mode at a first rate via at least one channel and receive in simplex mode at a second rate via at least one channel. The configured data rates are less than or equal to the respective maximum rates or a rate of zero. Link conditions comprise link load or utilization, current or past conditions, PER, BER and SNR. Power may be lowered for transmitters, receivers, near-end and/or far end cross talk cancellers, hybrids, echo cancellers and other components. Channels may be transitioned from duplex mode to simplex.

20 Claims, 4 Drawing Sheets

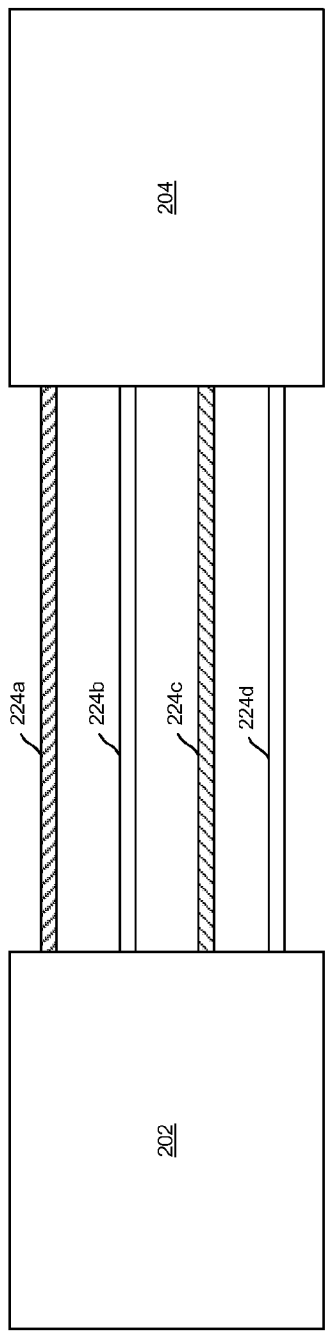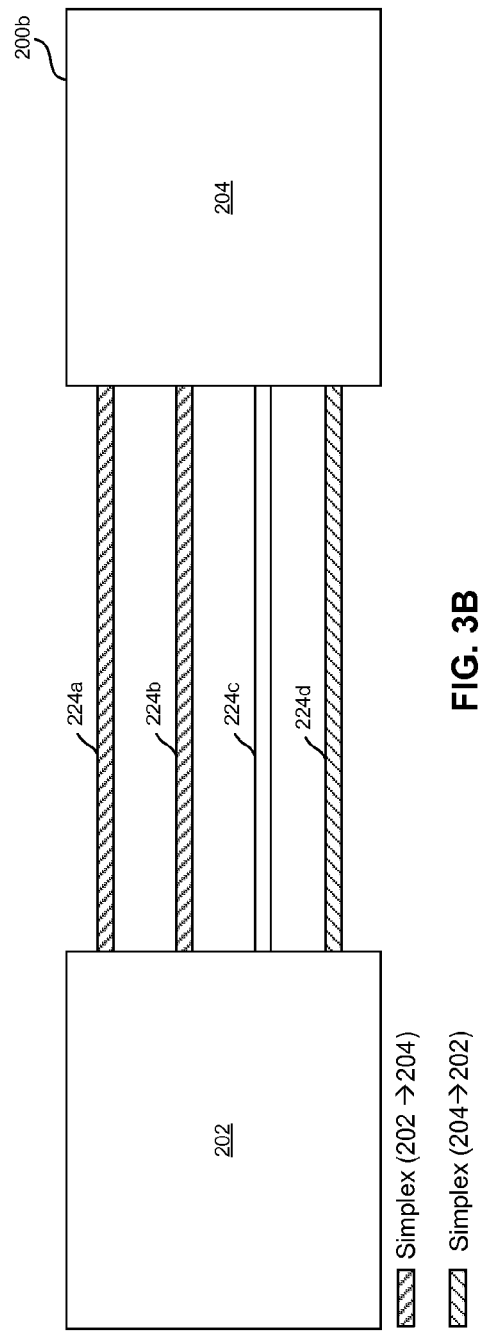

METHOD AND SYSTEM FOR SIMPLEX OR DUPLEX TRANSMISSION MODE OF AN ETHERNET LINK IN AN ENERGY EFFICIENT NETWORK

CROSS-REFERENCE TO RELATED APPLICATIONS/INCORPORATION BY REFERENCE

This application is a continuation of U.S. application Ser. No. 12/235,345, filed on Sep. 22, 2008 which in turn makes reference to and claims priority to U.S. Provisional Application Ser. No. 61/014,183 filed on Dec. 17, 2007, which is hereby incorporated herein by reference in its entirety.

This application is a continuation of U.S. application Ser. No. 12/235,345, filed on Sep. 22, 2008 which in turn makes reference to and claims priority to U.S. Provisional Application Ser. No. 61/094,612 filed on Sep. 5, 2008, which is hereby incorporated herein by reference in its entirety.

This patent application also makes reference to:
U.S. patent application Ser. No. 12/235,368 which was filed on Sep. 22, 2008;
U.S. patent application Ser. No. 12/235,391 which was filed on Sep. 22, 2008;
U.S. patent application Ser. No. 12/235,410 which was filed on Sep. 22, 2008; and
U.S. patent application Ser. No. 12/235,506 which was filed on Sep. 22, 2008.

Each of the above stated applications is hereby incorporated herein by reference in its entirety.

FIELD OF THE INVENTION

Certain embodiments of the invention relate to networking. More specifically, certain embodiments of the invention relate to a method and system for simplex or duplex transmission mode of an Ethernet link in an energy efficient network.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often result in significant increases in power consumption.

New transmission technologies enable higher transmission rates over copper cabling infrastructures. Various efforts exist in this regard, including technologies that enable transmission rates that may even reach 100 Gigabit-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. With each 10× rate increase more sophisticated signal processing is required to maintain the 100 m standard cable range. Non-standard transmission rates comprise 2.5 Gbps as well as 5 Gbps.

The specification for 10 Gigabit-per-second (Gbps) Ethernet transmissions over twisted-pair cabling (10 GBASE-T) is intended to enable 10 Gbps connections over twisted-pair cabling at distances of up to 182 feet for existing cabling, and at distances of up to 330 feet for new cabling, for example. To achieve full-duplex transmission at 10 Gbps over four-pair twisted-pair copper cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. New IEEE cabling specifications are being considered for 40 Gbps and 100 Gbps rates.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a method and system for simplex or duplex transmission mode of an Ethernet link in an energy efficient network, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3A is a diagram illustrating a plurality of PHYs configured to communicate in symmetric simplex mode, in accordance with an embodiment of the invention.

FIG. 3B is a diagram illustrating a plurality of PHYs configured to communicate in asymmetric simplex mode via one or more channels, in accordance with an embodiment of the invention.

DETAILED DESCRIPTION OF THE INVENTION

Certain embodiments of the invention may be found in a method and system for simplex or duplex transmission mode of an Ethernet link in an energy efficient network. An Ethernet network may comprise link partners coupled via an Ethernet link wherein the Ethernet link may comprise one or more channels. The link partners may be configured to operate in simplex mode via the one or more channels based on determined conditions on the Ethernet link during communications via the one or more channels. The determined conditions may comprise, for example, utilization or load on the link partners or Ethernet link, current or past conditions and/or link statistics that may comprise one or more of packet error rate (PER), bit error rate (BER), signal to noise ration (SNR) for example. In addition, one or more of the channels may be transitioned to a lower power mode with a zero data rate. In some embodiments of the invention, one or more of a plurality of operational changes may occur during simplex mode operation. For example, during simplex mode operation, power may be lowered for one or more components that enable communication such as receivers, transmitters, near-end cross talk cancellers, far-end cross talk cancellers and/or echo cancellers, for example. Operating in simplex mode and/or with lower power modes may enable more energy efficient Ethernet communications.

Figure 1:
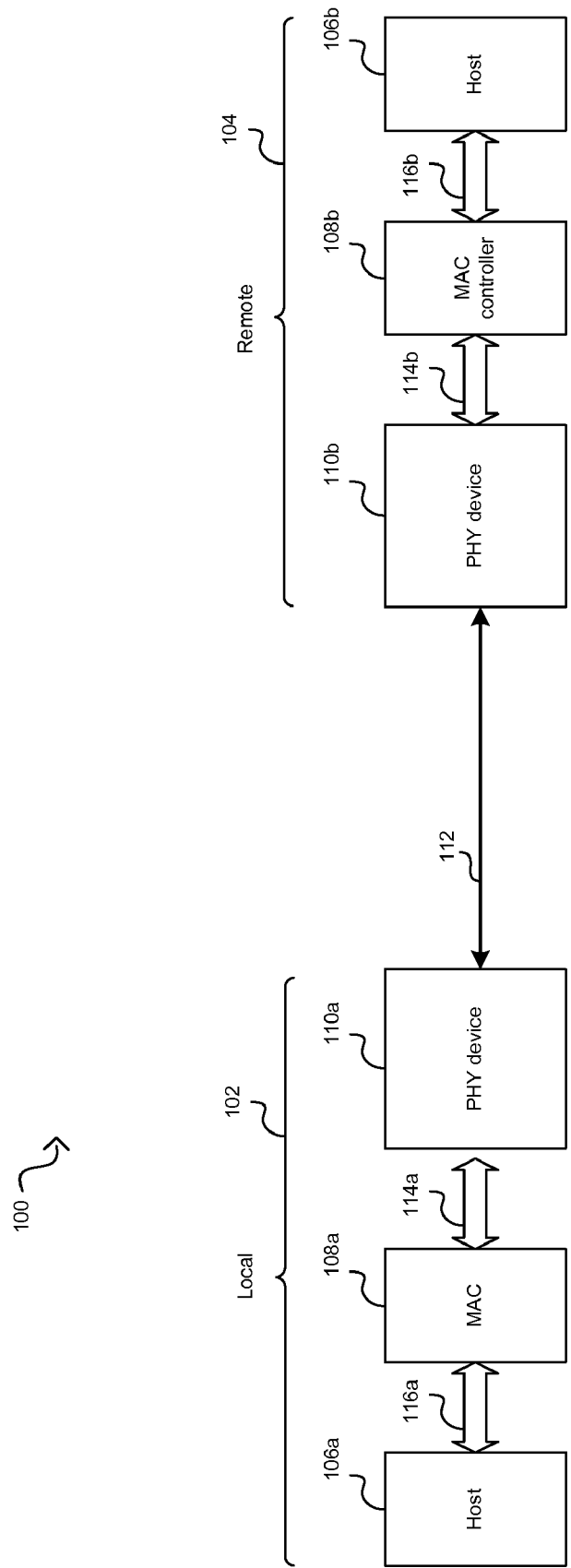
FIG. 1 is a block diagram illustrating an Ethernet connection between a local link partner and a remote link partner, in accordance with an embodiment of the invention.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 may communicate via a cable 112. In an exemplary embodiment of the invention, the cable 112 may comprise up to four or more channels, each of which may, for example, comprise an unshielded twisted pair (UTP). The local link partner 102 and the remote link partner 104 may communicate via a two or more channels comprising the cable 112. For example, Ethernet over twisted pair standards 10Base-T and 100Base-TX may utilize two pairs of UTP while Ethernet over twisted pair standards 1000Base-T and 10 GBase-T may utilize four pairs of UTP.

In an exemplary embodiment of the invention, the link partners 102 and/or 104 may comprise a twisted pair PHY capable of operating at one or more standard rates such as 10 Mbps, 100 Mbps, 1 Gbps, and 10 Gbps (10BASE-T, 100 GBASE-TX, 1 GBASE-T, and/or 10 GBASE-T); potentially standardized rates such as 40 Gbps and 100 Gbps; and/or non-standard rates such as 2.5 Gbps and 5 Gbps.

In an exemplary embodiment of the invention, the link partners 102 and/or 104 may comprise a backplane PHY capable of operating at one or more standard rates such as 10 Gbps (10 GBASE-KX4 and/or 10 GBASE-KR); potentially standardized rates such as 40 Gbps and 100 Gbps and/or non-standard rates such as 2.5 Gbps and 5 Gbps.

In an exemplary embodiment of the invention, the link partners 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

The local link partner 102 may comprise a host 106a, a medium access control (MAC) controller 108a, and a PHY device 110a. The remote link partner 104 may comprise a host 106b, a MAC controller 108b, and a PHY device 110b. Notwithstanding, the invention is not limited in this regard. In various embodiments of the invention, the link partner 102 and/or 104 may comprise, for example, computer systems or audio/video (A/V) enabled equipment. In this regard, A/V equipment may, for example, comprise a microphone, an instrument, a sound board, a sound card, a video camera, a media player, a graphics card, or other audio and/or video device. Additionally, the link partners 102 and 104 may be enabled to utilize Audio/Video Bridging and/or Audio/video bridging extensions (collectively referred to herein as AVB) for the exchange of multimedia content and associated control and/or auxiliary data.

The PHY devices 110a and 110b may each comprise suitable logic, circuitry, and/or code that may enable communication, for example, transmission and reception of data, between the local link partner 102 and the remote link partner 104. The PHY devices 110a and 110b may support, for example, Ethernet operations. The PHY device s 110a and 110b may enable communications, such as 10 Mbps, 100 Mbps, 1000 Mbps (or 1 Gbps), 2.5 Gbps, 4 Gbps, 5 Gbps, 10 Gbps or 40 Gbps or 100 Gbps for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception at a high (er) data rate in one direction and transmission and/or reception at a low(er) data rate in the other direction. For example, the local link partner 102 may comprise a multimedia server and the remote link partner 104 may comprise a multimedia client. In this regard, the local link partner 102 may transmit multimedia data, for example, to the remote partner 104 at high(er) data rates while the remote link partner 104 may transmit control or auxiliary data associated with the multimedia content at low(er) data rates. In addition, a change in rate such as stepping up in rate or stepping down in rate may occur asymmetrically among the PHY devices 110a and/or 110b which may support energy efficient Ethernet. For example, the PHY device 110a may change its rate based on a change of rate in 110b, however, the PHY device 110a may change to a different rate than the PHY device 110b. Moreover, the PHY devices 110a and 110b may change rates independent of each other, for example, one PHY may change rate while the other does not change rate. Moreover, in some embodiments of the invention, one or more of the PHY devices may step down to a rate of zero.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. The data transmitted may also comprise IDLE symbols that may be communicated between frames of data, during inter frame gap (IFG)).

In an exemplary embodiment of the invention illustrated in FIG. 1, the hosts 106a and 106b may represent layer 2 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may operate within, for example, a 1 Gbps or 10 Gbps network. Conventionally, the PHY devices 110a and 110b may operate in duplex mode wherein data may be transmitted and received bidirectionally on each channel. Although duplex operation may increase overall throughput of a channel and a link comprising that channel, conventional PHY devices may require complex circuitry for separating transmitted traffic from received traffic in a duplex channel. In this regard, circuitry for processing signals received over a channel which comprises bidirectional traffic may consume significant amounts of power. In accordance with various embodiments of the invention, when high(er) data rates are unnecessary on a network link, portions of the PHY corresponding to one or more channels in the link may be configured to operate in simplex or unidirectional mode. In this regard, portions of the circuitry utilized for processing signals in duplex mode may not be utilized for simplex mode or may be operated at much lower power. Accordingly, those portions of circuitry which are not utilized for communication in the simplex mode may be turned off or placed into a low(er) power mode, thereby reducing power consumption.

Figure 2:
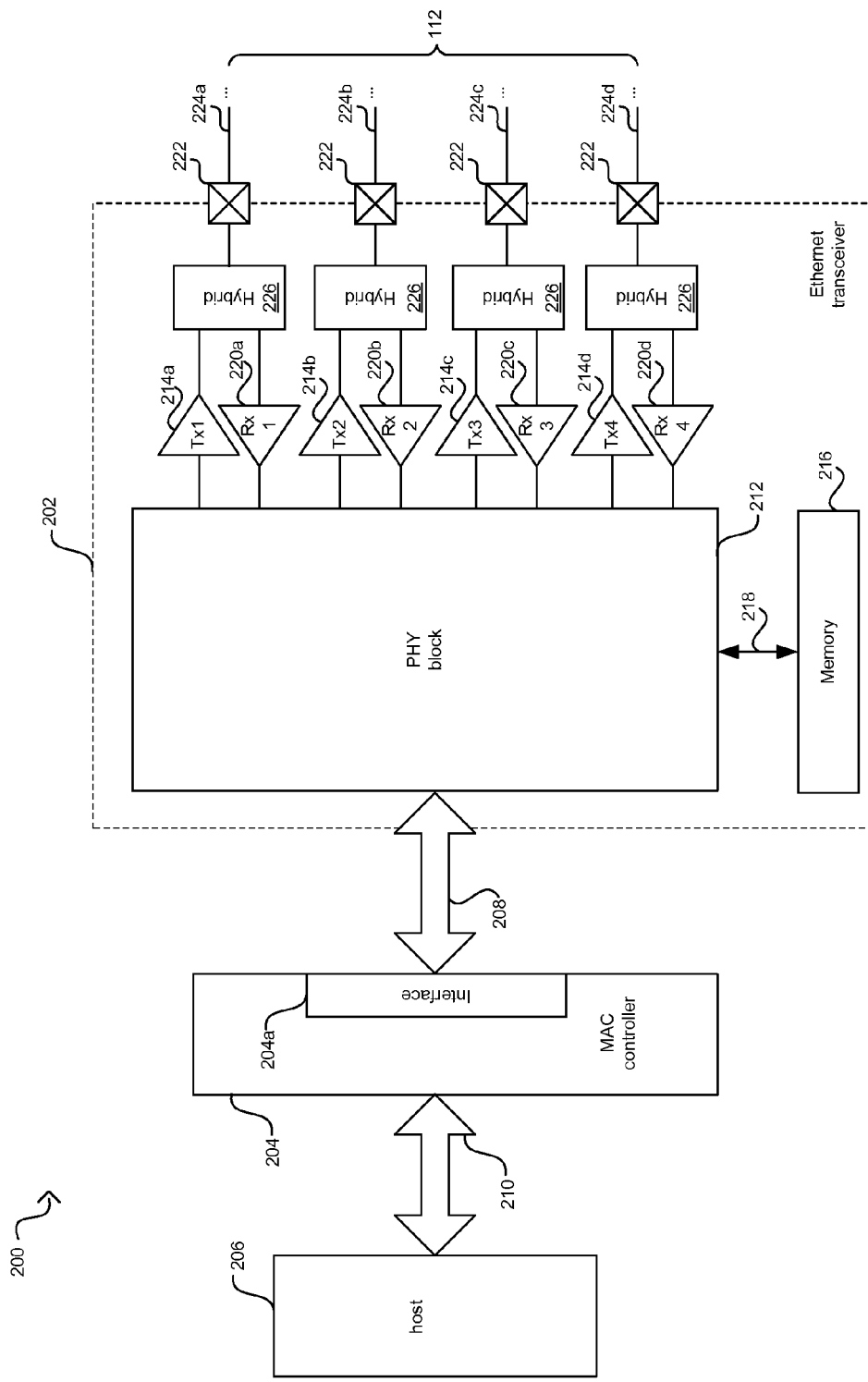
FIG. 2 is a block diagram illustrating an exemplary Ethernet over twisted pair PHY device architecture comprising a physical block, in accordance with an embodiment of the invention.

FIG. 2 is a block diagram illustrating an exemplary Ethernet over twisted pair PHY device architecture, in accordance with an embodiment of the invention. Referring to FIG. 2, there is shown a link partner 200 which may comprises an Ethernet over twisted pair PHY device 202, a MAC controller 204, a host 206, an interface 208, and a bus controller interface 210. The PHY device 202 may be an integrated device which may comprise a physical layer block 212, one or more transmitters 214, one or more receivers 220, a memory 216, a memory interface 218, one or more input/output interfaces 222 and the channels 224.

The PHY device 202 may be an integrated device that may comprise a physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise an interface 204a that may comprise suitable logic, circuitry, and/or code to enable communication with the PHY device 202 via the interface 208.

The physical layer block 212 in the PHY device 202 may comprise suitable logic, circuitry, and/or code that may enable operability and/or functionality of physical layer requirements. In this regard, the physical layer block 212 may enable generating the appropriate link discovery signaling utilized for establishing communication with a remote PHY device in a remote link partner. The physical layer block 212 may communicate with the MAC controller 204 via the interface 208. In one aspect of the invention, the interface 208 may be a media independent interface (MII) and may be configured to utilize a plurality of serial data lanes for receiving data from the physical layer block 212 and/or for transmitting data to the physical layer block 212. The physical layer block 212 may be configured to operate in one or more of a plurality of communication modes, where each communication mode may implement a different communication protocol. These communication modes may include, but are not limited to, Ethernet over twisted pair standards 10Base-T, 100Base-TX, 1000Base-T, 10 GBase-T, and other similar protocols. The physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the physical layer block 212. The parameters may comprise configuration data and the code may comprise operational code such as software and/or firmware, but the information need not be limited in this regard. Moreover, the parameters may include adaptive filter and/or block coefficients for use by the physical layer block 212, for example.

Each of the transmitters 214a, 214b, 214c, 214d may comprise suitable logic, circuitry, and/or code that may enable transmission of data from the link partner 200 to a remote link partner via, for example, the cable 112 in FIG. 1. The receivers 220a, 220b, 220c, 220d may comprise suitable logic, circuitry, and/or code that may enable receiving data from a remote link partner. Each of the transmitters 214a, 214b, 214c, 214d and receivers 220a, 220b, 220c, 220d in the PHY device 202 may correspond to a channel that may comprise the cable 112. In this manner, a transmitter/receiver pair may interface with each of the channels 224a, 224b, 224c, 224d. In this regard, the transmitter/receiver pairs may be enabled to provide the appropriate communication rate and mode for each channel.

The input/output interfaces 222 may comprise suitable logic circuitry, and/or code that may enable the PHY device 202 to impress signal information onto a physical medium comprising a channel, for example a twisted pair channel comprising the cable 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium comprising the channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may conventionally operate in duplex mode where data may be simultaneously transmitted and received over one or more channels, such as channels 224a, 224b, 224c and 224d (collectively referred to as 224). For example, 100 Mbps, 1 Gbps, 10 Gbps networks may utilize duplex mode, wherein, 100 Mbps may use two of the 4 channels and 1 Gbps may use four sets of two pairs. The link partner 200 may comprise hybrids 226, each of which may comprise suitable logic, circuitry, and/or code for separating transmitted and received signals. In this manner, the PHY device 202 may operate at a full (or high(er)) data rate. However, there may be times when operating at the full (or high(er)) data rate may be unnecessary. Accordingly, a PHY device may transition to simplex mode communication, for example, transmitting only on one or more channels and/or receiving only on one or more channels. In this regard, the communication rates may be symmetric or asymmetric with regard to the direction of data flow.

FIG. 3A is a diagram illustrating a plurality of PHYs configured to communicate in symmetric simplex mode, in accordance with an embodiment of the invention. Referring to FIG. 3A there are shown two PHY devices 202 and 204 that may be similar or substantially the same as the PHY device 202 described in FIG. 2 and four channels 224a, 224b, 224c and 224d (collectively referred to as 224) that may be similar to or substantially the same as the channels 224a, 224b, 224c and 224d described in FIG. 2.

FIG. 3A illustrates an exemplary embodiment of the invention wherein data rates for traffic travelling to and/or from the PHY device 202 may be symmetrically reduced to a fraction of the maximum supported data rate. Lowering data rates in both directions to a same data rate may be enabled utilizing simplex transmit/receive patterns. Referring to FIG. 3A, channel 224a may be configured for simplex operation and may transmit data in only in one direction, outbound from PHY device 202 while the channel 224c may be configured for simplex operation and may transmit data at the same rate, only in the other direction, inbound to PHY device 202. Moreover, the channels 224b and 224d may be transitioned to a zero data rate lower power state. Accordingly, portions of the hybrids 226, shown in FIG. 2, that may be enabled to separate transmitted signals from received signals, may be placed in a zero data rate low(er) power mode. Additionally, the receivers 220a, 220b and 220d and the transmitters 214b, 214c and 214d shown in FIG. 2, may be placed in a zero data rate low(er) power mode. Simplex operation may be enabled so as to, for example, conserve energy. In this regard, resources such as noise cancellers and/or filters utilized during duplex operation may not be needed for simplex operation and may be turned off or they may be configured to operate in a much lower power mode.

FIG. 3B is a diagram illustrating a plurality of PHYs configured to communicate in asymmetric simplex mode via one or more channels, in accordance with an embodiment of the invention. Referring to FIG. 3B, the PHY devices 202 and/or 204 may determine appropriate rates for data traffic in each direction. Each PHY device may negotiate for its own transmission rate and each may accept or reject its own receiving rate. For example, the PHY device 202 may request transmitting at a lower rate A and the PHY device 204 may accept or reject receiving the lower rate A. In addition, the PHY device 204 may request changing its transmission rate to a different rate, rate B, and the PHY device 202 may accept or reject the request from device 204. Accordingly, it may be determined and communicated that the channels 224a, 224b, 224c and 224d may carry traffic in a simplex mode wherein the channels 224a and 224b may collectively deliver data at a rate of A from device 202 to device 204 and channel 224d may deliver data at a rate of B from device 204 to device 202. The channel 224c may not need to carry traffic and may be transitioned to a low(er) power level and/or a data rate of zero. In this manner, portions of the hybrids 226a, 226b, and 226c associated with reception and the receivers 220a, 220b, and 220c in PHY device 202, may be placed in a zero data rate low(er) power mode. For example, one or more near-end cross talk cancellers, far-end cross talk cancellers and eco cancellers may be turned off.

Various other embodiments of the invention may comprise any number of channels each of which may be configured for simplex or duplex operation, without deviating from the scope of the present invention.

In operation, a PHY 204 may be transmitting at a full rate of 10 GBASET, for example, and may determine that a lower data rate of 1 Gbps may be sufficient for a level of data in queue for transmission to PHY 202. The link partner 204 may send a request for the desired rate change to the link partner 202. The PHY 202 may acknowledge the rate change request for data the PHY 202 may receive from PHY 204. However, the PHY 202 may maintain its current rate of data transmission while the PHY 204 reduces its rate of transmission. In this regard, PHY 204 may transmit via one channel in simplex mode at 1 Gbps.

Figure 4:
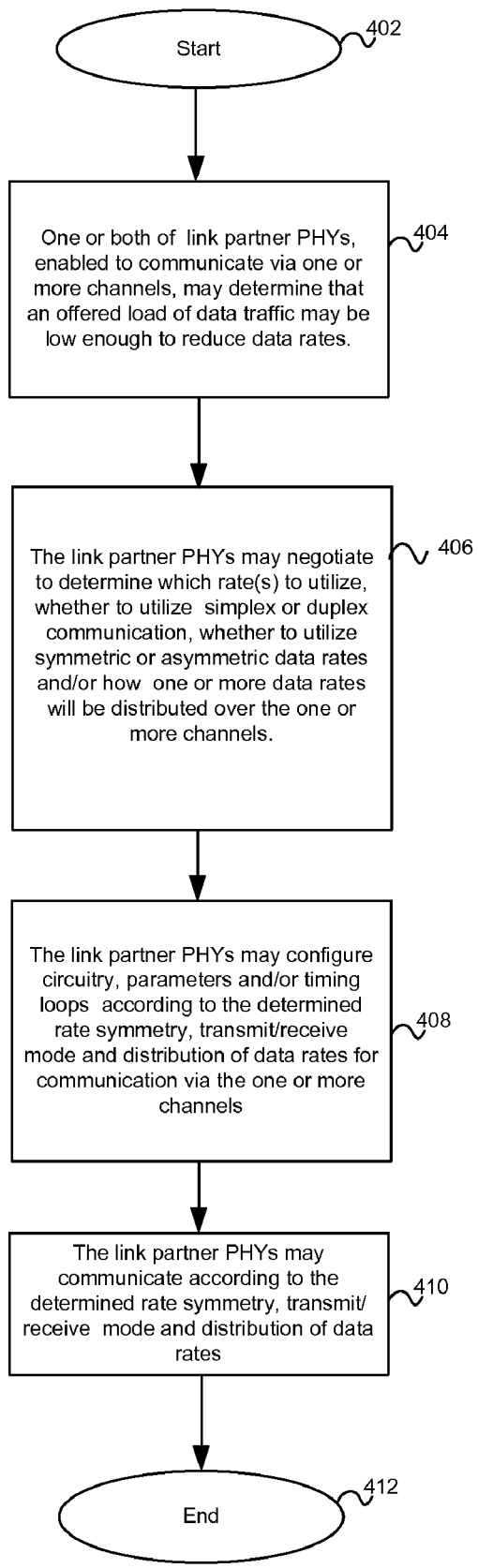
FIG. 4 is a flow chart illustrating exemplary steps for enabling rate changes between link partners, in accordance with an embodiment of the invention.

FIG. 4 is a flow chart illustrating exemplary steps for enabling rate changes between link partners, in accordance with an embodiment of the invention. Referring to FIG. 4, after start step 402, in step 404, one or both of link partner PHYs 110a and/or 110b, enabled to communicate via one or more channels 224a, 224b, 224c and/or 224d, may determine that an offered load of data traffic may be low enough to reduce data rates. In step 406, the link partner PHYs 110*a* and 110*b* may negotiate to determine which rate(s) to utilize for communication, whether to utilize simplex or duplex mode communication, whether to utilize symmetric or asymmetric data rates and/or how one or more data rates may be distributed over the one or more channels 224*a*, 224*b*, 224*c* and/or 224*d*. In step 408, the link partner PHYs 110*a* and/or 110*b* may configure circuitry, parameters and/or timing loops according to the determined rate symmetry transmit/receive mode and distribution of data rates for communication via the one or more channels 224*a*. 224*b*, 224*c* and/or 224*d*. In step 410, the link partner PHYs 110*a* and 110*b* may communicate according to the determined rate symmetry, transmit/receive mode and distribution of data rates. The exemplary steps may end at step 412.

In an embodiment of the invention, an Ethernet network 100 may comprise link partners 102 and 104 coupled via an Ethernet link 112 wherein the Ethernet link 112 may comprise one or more channels 224*a*, 224*b*, 224*c* and/or 224*d*, for example. The link partners 102 and 104 may be configured to operate in simplex mode via the one or more channels 224 based on determined conditions on the Ethernet link 112 during communications via the one or more channels 224. The determined conditions may comprise, for example, utilization or load on the link partners 102 and/or 104 or Ethernet link 112, current or past conditions and/or link statistics that may comprise one or more of packet error rate (PER), bit error rate (BER), signal to noise ration (SNR) for example. In addition, one or more of the channels 224 may be transitioned to a lower power mode with a zero data rate. In some embodiments of the invention, one or more of a plurality of operational changes may occur during simplex mode. For example, during simplex mode operation, power may lowered for one or more components that enable communication via the one or more channels such as receivers 220, transmitters 214, near-end cross talk cancellers, far-end cross talk cancellers and/or echo cancellers, for example.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for simplex or duplex transmission mode of an Ethernet link in an energy efficient network.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
in an Ethernet network comprising link partners coupled via an Ethernet link, wherein said Ethernet link comprises a plurality of channels:
in a first link partner, said first link partner is operable to transmit data at a first maximum rate to a second link partner via at least a first channel and said first link partner is operable to receive data at a second maximum rate from said second link partner via at least a second channel:
determining one or more conditions on said Ethernet link for one or more of said plurality of channels, and
configuring said first link partner to communicate in simplex mode at a first data rate via said at least said first channel and receive data in simplex mode at a second data rate via said at least said second channel, based on said determination, wherein said configured first data rate is less than or equal to said first maximum rate and/or said configured second data rate is less than or equal to said second maximum rate.

2. The method according to claim 1, comprising during operation in said simplex mode, lowering power for one or more receivers that enables communication via said one or more of said plurality of channels.

3. The method according to claim 1, comprising during operation in said simplex mode, lowering power for one or more transmitters that enables communication via said one or more of said plurality of channels.

4. The method according to claim 1, comprising during said operation in simplex mode, lowering power for one or more components that enables communication via said one or more of said plurality of channels.

5. The method according to claim 1, comprising transitioning said one or more of said plurality of channels to a zero data rate lower power mode.

6. The method according to claim 1, wherein said configuring comprises transitioning one or more of said plurality of channels from operation in a duplex mode to operation in said simplex mode.

7. The method according to claim 1, wherein said one or more conditions comprise a load on said link partners and/or utilization of said Ethernet link.

8. The method according to claim 1, wherein said one or more conditions comprise one or both of current link conditions and past link conditions on said Ethernet link.

9. The method according to claim 1, wherein said one or more conditions comprise one or more of packet error rate (PER), bit error rate (BER), and signal to noise ratio (SNR) of said Ethernet link.

10. The method according to claim 1, comprising during operation in said simplex mode, lowering power for one or more near-end cross talk cancellers, one or more far end cross talk cancellers, one or more hybrids and/or one or more echo cancellers that enables communication via said one or more of said plurality of channels.

11. A system for networking, the system comprising:
in an Ethernet network comprising link partners coupled via an Ethernet link, wherein said Ethernet link comprises a plurality of channels, one or more circuits for use in a first link partner, said one or more circuits being operable to transmit data at a first maximum rate to a second link partner via at least a first channel and to receive data at a second maximum rate from said second link partner via at least a second channel; and
said one or more circuits being operable to:
determine one or more conditions on said Ethernet link for one or more of said plurality of channels, and
configure said first link partner to communicate in simplex mode at a first data rate via said at least said first channel and receive data in simplex mode at a second data rate via said at least said second channel, based on said determination, wherein said configured first data rate is less than or equal to said first maximum rate and/or said configured second data rate is less than or equal to said second maximum rate.

12. The system according to claim 11, wherein during operation in said simplex mode, said one or more circuits are operable to lower power for one or more transmitters and/or for one or more receivers that enables communication via said one or more of said plurality of channels.

13. The system according to claim 11, wherein during operation in said simplex mode, said one or more circuits are operable to lower power for one or more components that enables communication via said one or more of said plurality of channels.

14. The system according to claim 11, wherein said one or more circuits are operable to transition said one or more of said plurality of channels to a zero data rate lower power mode.

15. The system according to claim 11, wherein said configuring comprises transitioning one or more of said plurality of channels from operation in a duplex mode to operation in said simplex mode.

16. The system according to claim 11, wherein said one or more conditions comprise a load on said link partners and/or utilization of said Ethernet link.

17. The system according to claim 11, wherein said one or more conditions comprise one or both of current link conditions and past link conditions on said Ethernet link.

18. The system according to claim 11, wherein said one or more conditions comprise one or more of packet error rate (PER), bit error rate (BER) and signal to noise ratio (SNR) of said Ethernet link.

19. The system according to claim 11, wherein during operation in said simplex mode, said one or more circuits are operable to lower power for one or more near-end cross talk cancellers, one or more far end cross talk cancellers, one or more hybrids and/or one or more echo cancellers that enables communication via said one or more of said plurality of channels.

20. A method for networking, the method comprising:
in an Ethernet network comprising link partners coupled via an Ethernet link, wherein said Ethernet link comprises a plurality of channels,
in a first of said link partners:
determining one or more conditions on said Ethernet link for one or more of said plurality of channels;
negotiating a transmission data rate and/or accepting or rejecting a reception data rate based on said determination; and
configuring said first link partner to operate in a simplex mode on a selected one or more of said plurality of channels when communicating via said Ethernet link, based on said determination.

* * * * *